United States Patent [19]

Tower et al.

[11] Patent Number: 5,392,446
[45] Date of Patent: Feb. 21, 1995

[54] MULTIPLE CLUSTER SIGNAL PROCESSOR ARCHITECTURE

[75] Inventors: Lee W. Tower; Jeffrey A. Wagner, both of Rancho Palos Verdes; Douglas M. Benedict, Santa Monica, all of Calif.

[73] Assignee: Hughes Aircraft Company, Los Angeles, Calif.

[21] Appl. No.: 17,362

[22] Filed: Feb. 11, 1993

Related U.S. Application Data

[63] Continuation of Ser. No. 486,982, Feb. 28, 1990, abandoned.

[51] Int. Cl.$^6$ .................. G06F 12/00; G06F 13/00
[52] U.S. Cl. ................... 395/800; 395/425; 395/200; 395/325; 364/229.5; 364/230.6; 364/241.9; 364/244.8; 364/254.2; 364/DIG. 1
[58] Field of Search ............... 395/800, 325, 425, 275, 395/200; 370/53, 85.1, 85.6; 340/825

[56] References Cited

U.S. PATENT DOCUMENTS

| | | | |
|---|---|---|---|
| 4,006,466 | 2/1977 | Patterson et al. | 395/275 |
| 4,644,496 | 2/1987 | Andrews | 395/800 |
| 4,654,780 | 3/1987 | Logsdon et al. | 395/325 |
| 4,740,894 | 4/1988 | Lyon | 395/425 |
| 4,833,605 | 5/1989 | Terada et al. | 395/400 |
| 4,837,676 | 6/1989 | Rosman | 395/425 |
| 4,901,230 | 2/1990 | Chen et al. | 395/325 |
| 4,968,977 | 11/1990 | Chinnaswamy et al. | 340/825.8 |
| 5,041,963 | 8/1991 | Ebersole et al. | 395/200 |
| 5,093,920 | 3/1992 | Agrawal et al. | 395/800 |
| 5,123,011 | 6/1992 | Hein et al. | 370/58.1 |
| 5,175,824 | 12/1992 | Soderbery et al. | 395/325 |
| 5,228,127 | 7/1993 | Ikeda et al. | 395/200 |

Primary Examiner—Alyssa H. Bowler
Assistant Examiner—Alpesh M. Shah
Attorney, Agent, or Firm—L. A. Alkov; W. K. Denson-Low

[57] ABSTRACT

A signal processor architecture that comprises a data network having multiple ports, a control bus, and a plurality of signal processing clusters connected to at least two ports and the control bus. Each signal processing cluster comprises a system control processor connected to the control bus, a second control bus, and a global bulk memory having multiple ports. A plurality of functional processing elements are connected to the system control processor by way of the second control bus, and each are connected to a port of the global bulk memory. The global bulk memory comprises a subdata flow network having multiple gateways and full crossbar interconnectivity between each of the multiple gateways. The data network and subdata flow network allow data to be transferred between functional processing elements in the signal processing cluster and any functional processing element and global bulk memory in another signal processing cluster, and allow data to be transferred from any functional processing element into and out of the processor architecture. The first control bus is arbitrated for access on a message by message basis and the data network is arbitrated on a message by message basis for transfers between ports. This results in a relatively loose coupling between the signal processing clusters. The second control bus is arbitrated for access on a word by word basis and the global bulk memory is arbitrated for port access on each global bulk memory cycle. This results in tight coupling within each signal processing cluster.

4 Claims, 2 Drawing Sheets

MULTIPLE CLUSTER SIGNAL PROCESSOR ARCHITECTURE

CROSS REFERENCE TO RELATED APPLICATIONS

This application is a continuation of U.S. patent application Ser. No. 07/486,982, filed Feb. 28, 1990, now abandoned.

BACKGROUND

The present invention relates generally to signal processors, and more particularly, to a multiple cluster signal processor architecture that provides for very low latency while at the same time providing high throughput.

Conventional noncluster architectures use a data network to communicate between processing elements and memories. Such noncluster architectures have their processing elements and global memories attached directly to the data network. Element supervisory units, which generally implement system control processor functions, communicate by way of a processor interface bus. Attaching functional processing elements directly to the data network instead of the global bulk memory in a cluster architecture may at first seem to be an advantage. However, there are several important disadvantages associated with such noncluster architecture.

The noncluster architecture requires significantly more modules than the cluster architecture. There are two reasons for this. One is that there are more modules for the data network function in the noncluster architecture. Second, there are more element supervisory units compared to the number of system control processors in the cluster architecture. Each element supervisory unit could be made to control more processing elements to reduce the number of element supervisory units. However, each element supervisory Unit would then be required to handle significantly more control operations for accomplishing transfers across the data network.

Only one data port per global bulk memory may be attached to the data network of a noncluster architecture. Thus, the total global bulk memory access bandwidth for all processor elements is limited to one port access per global bulk memory. Consequently, many processor elements may need to wait for data while one processing element accesses the data it needs. Switching between multiple users of one global bulk memory occurs with a high latency penalty, because the transfer of an entire block of data to one user must be completed before a transfer can begin to another user.

The number of ports on the data network in a noncluster architecture may result in implementation of less than a full crossbar, which may lead to blocking on the data network and also result in latency delays before transfers begin. The latency that results can range from 50 microseconds for an ongoing thousand word transfer to 500 microseconds for a ten thousand word transfer. Furthermore, all transfers to and from the global bulk memory must pass through a single data port of the data network. One type of data that is transferred into the global bulk memory is raw radar data, for example. Depending on the bandwidth required by the radar data input, it is possible that this single data port of the global bulk memory could have a full time job storing the dam. Since this same port is used to access the data for a processing element from the-global bulk memory, this could turn into a significant system bottleneck. In the extreme case, the global bulk memory in the noncluster architecture turns into a write only memory.

SUMMARY OF THE INVENTION

In order to overcome the deficiencies of conventional signal processors, the present invention provides for a multiple cluster signal processor architecture that comprises a data network having multiple ports, a control bus, and a plurality of signal processing clusters respectively connected to at least two ports and the control bus. The multiple ports have full crossbar connectivity via the data network. The architecture provides communication capability between the multiple ports, the control bus and each of the plurality of signal processing clusters.

Each signal processing cluster comprises a system control processor connected to the control bus and a second control bus and a global bulk memory having multiple ports. One of the multiple ports is connected to the system control processor by way of the second control bus and two of the ports are connected to two of the ports on the data network. A plurality of functional processing elements are respectively connected to the system control processor by way of the second control bus, and are each respectively connected to one of the ports on the global bulk memory.

Each signal processing cluster further comprises at least one first input/output element connected to a port on the data network and to the second control bus and having an input/output interface. The first control bus is arbitrated for access on a message by message basis and the data network is arbitrated on a message by message basis for transfers between ports on the data network. This results in a relatively loose coupling between the signal processing clusters. The second control bus is arbitrated for access on a word by word basis and the global bulk memory is arbitrated. for port access on each global bulk memory cycle. This results in fight coupling within each signal processing cluster.

The signal processor architecture further comprises a sub data flow network having multiple gateways each connected to one of the ports on the global bulk memory and having full crossbar interconnectivity between each of the multiple gateways. The subdata flow network together with the data flow network provide a means whereby data may be transferred by way of the subdata flow network and the data network between any of the functional processing elements in one signal processing cluster and any of the functional processing elements and the global bulk memory in another signal processing cluster, and a means whereby data can be transferred via the subdata flow network and the data network between any of the functional processing elements and the first input/output elements.

The signal processor architecture further comprises a first test and maintenance bus connected to the data network and to each the system control processor in each the cluster, and a plurality of second test and maintenance buses wherein one of the second test and maintenance buses is connected within each signal processing cluster to the system control processor, the global bulk memory, each of the functional processing elements and the input/output element. The signal processor architecture further comprises at least one second input/output element connected to the first control bus and the first test and maintenance bus.

The data network of the multiple cluster signal processing architecture has fewer ports than noncluster architectures. This permits a full crossbar to be easily implemented. Similarly, the cluster architecture has fewer processor interface bus users, which results in lower bus loading and latency. Typically, the processor interface bus access is arbitrated only at the end of a message, which can lead to a bottleneck on the processor interface bus when many users are connected. The write-only memory problem described above, while solvable for the noncluster architecture, is nonexistent for the cluster architecture, because processing elements access the data from the global bulk memory on ports that are separate from the port that is used to input the raw radar data.

A key advantage of the present invention is that its architecture provides for very low latency while at the same time providing high throughput. This is in comparison to other known architectures. The cluster architecture is a key reason for this. Each cluster has a global bulk memory that has at least two ports to the data network that provides simultaneous access to the global memory by two other ports on the data network.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
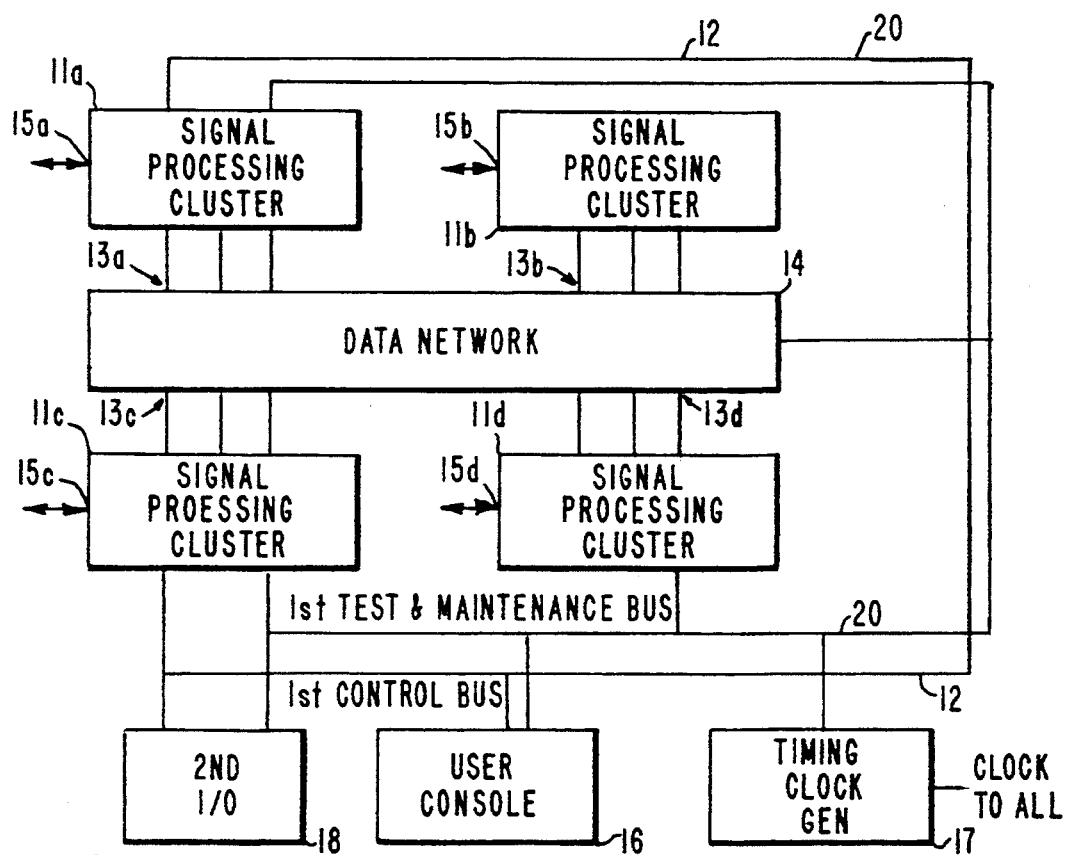
FIG. 1 illustrates a signal processing cluster architecture in accordance with the principles of the present invention.

Referring to FIG. 1, a signal processing cluster architecture 10 in accordance with the principles of the present invention is shown. The signal processing cluster architecture 10 includes a plurality of signal processing clusters 11a–11d that are interconnected by way of a first control bus 12. Each signal processing cluster 11a–11d is coupled by way of a plurality of data network ports 13a–13d on a data network 14. Each signal processing cluster 11a–11d has a first input/output port 15a–15d that is adapted to couple data to be processed into, and processed data out of the signal processing cluster architecture 10. A user console interface 16, timing clock generator 17 and a second input/output interface 18 are coupled to the first control bus 12 to provide for interface and timing to the signal processing clusters 11a–11d.

Each of the signal processing clusters 11a–11d are also interconnected by way of a first test and maintenance bus 20. The user console interface 16, timing clock generator 17 and second input/output interface 18 are coupled to the first test and maintenance bus 20 to couple test and maintenance instructions to the signal processing clusters 11a–11d.

Figure 2:
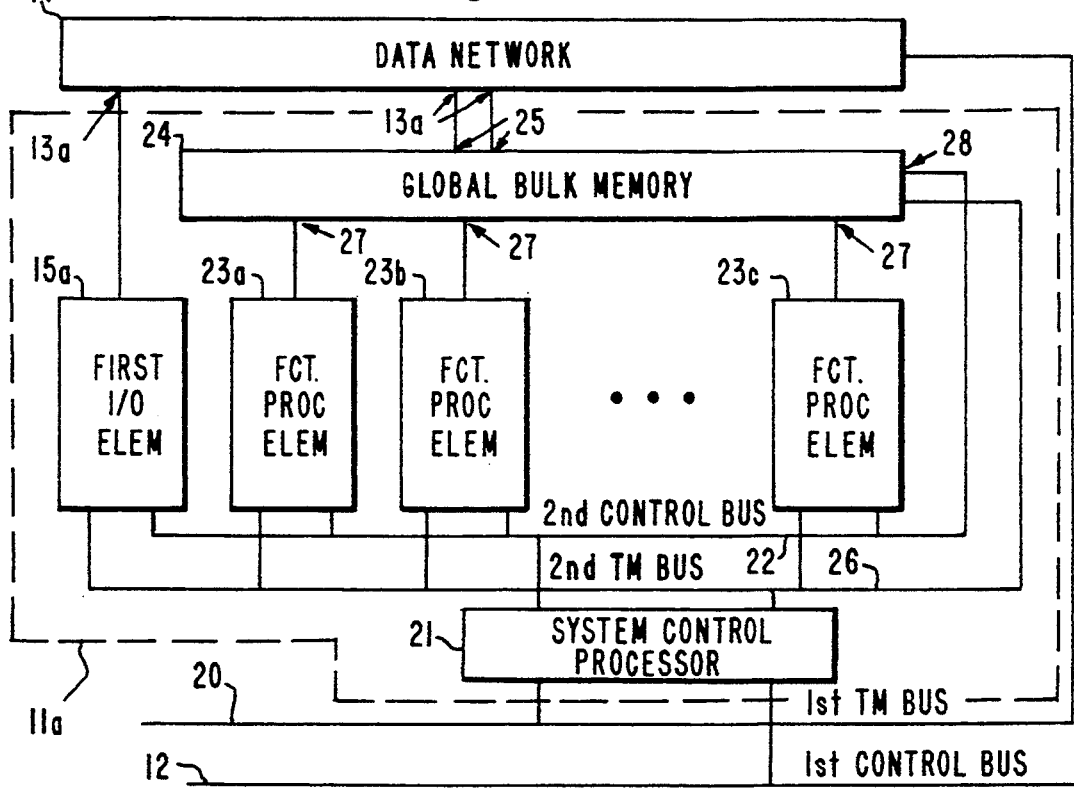
FIG. 2 illustrates the organization of a typical signal processing cluster of the architecture of FIG. 1.

Referring now to FIG. 2, it illustrates the organization of a typical signal processing cluster 11a of the cluster architecture 10 of FIG. 1. The cluster 11a includes a system control processor 21 that is coupled to the first control bus 12, and to a second control bus 22 that is adapted to provide control signals to a plurality of functional processing elements 23a–23c, the first input/output port 15a, and global bulk memory 24. The data network 14 and functional processing elements 23a–23c are coupled to a global bulk memory 24. The interface between the data network 14 and the global bulk memory 24 is achieved by means of individual data ports 25 and global bulk memory 24. The system control processor 21 is coupled to each of the functional processing elements 23a–23c, the first input/output port 15a, and the global bulk memory 24 by way of a second test and maintenance bus 26.

Figure 3:
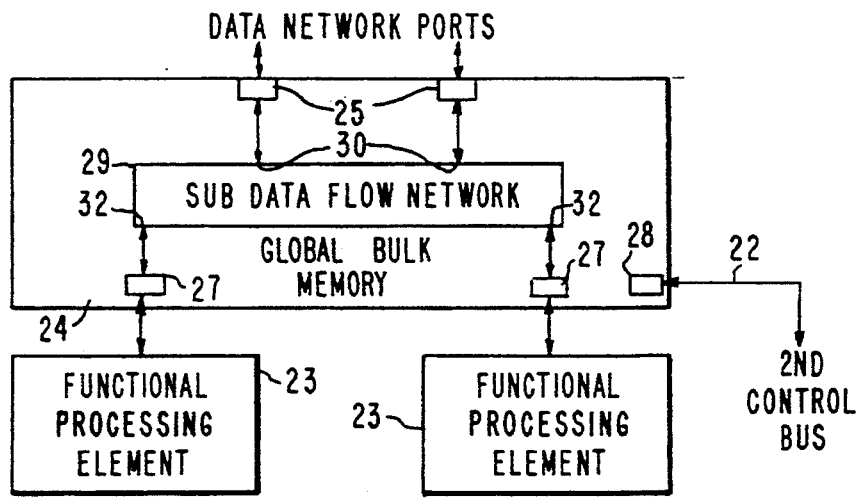
FIG. 3 illustrates the organization of the global bulk memory of the signal processing cluster of FIG. 2.

Referring now to FIG. 3, it illustrates the organization of the global bulk memory 24 of the signal processing cluster of the architecture of FIG. 2. The global bulk memory 24 includes a plurality of processing element ports 27 that are employed to couple data to and from the functional processing elements 23a, 23b, a control bus port 28 employed to couple the global bulk memory 24 to the second control bus 22, and a plurality of data network ports 25 that couple to the data network 14. The global bulk memory 24 includes a sub data flow network 29 that is coupled to the data network 14 by way of a plurality of gateways 30, which are substantially identical in form to the data network ports 25, and a plurality of gateways 32 that couple it to the functional processing elements 23.

Figure 4:
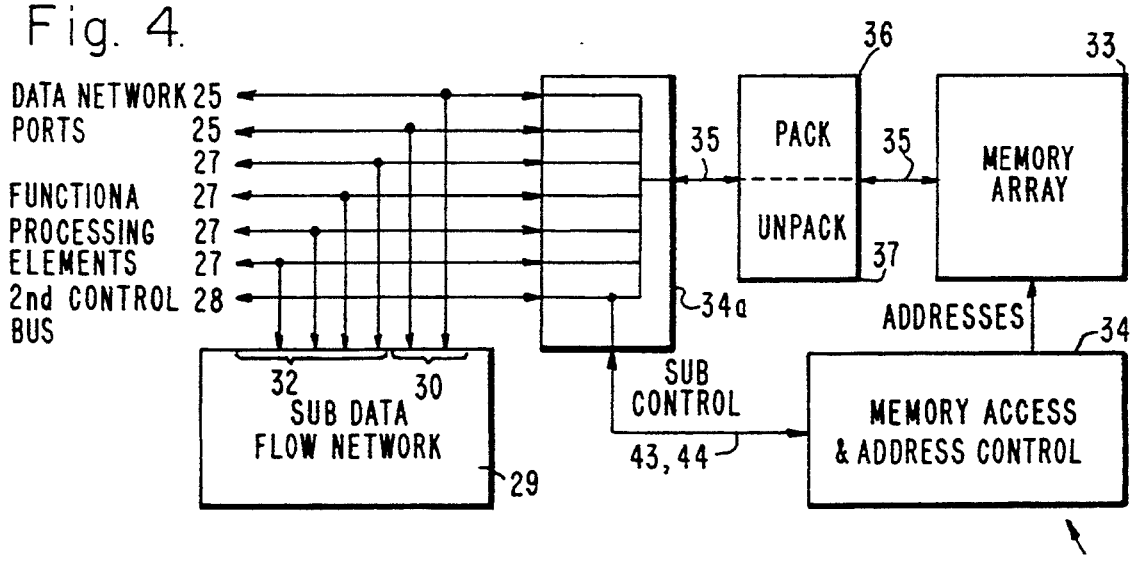
FIG. 4 illustrates the organization of the global bulk memory and sub data flow network of the signal processing cluster of FIG. 3.

FIG. 4 illustrates the details of the global bulk memory 24 and sub data flow network 29 of FIG. 3. The global bulk memory 24 includes a memory array 33 that comprises a multiple column memory array. A memory access and address controller 34 is coupled to the memory array 33 and to the data network pot 25, processing element ports 27 and control bus port 28 and is adapted to receive control sequences from the system control processor 21 data network ports 13 and functional processing elements 23. The memory array 33 is also coupled to the data ports 25 and the functional processing elements 23 by means of a global memory bus 35. Interposed between the data ports 25 and the memory array 33, and coupled to the global memory bus 35 are packing and unpacking circuits 36, 37. The packing and unpacking circuits 36, 37 are adapted to compress and decompress data read into or out of the memory array 33, as the case may be.

Figure 5:
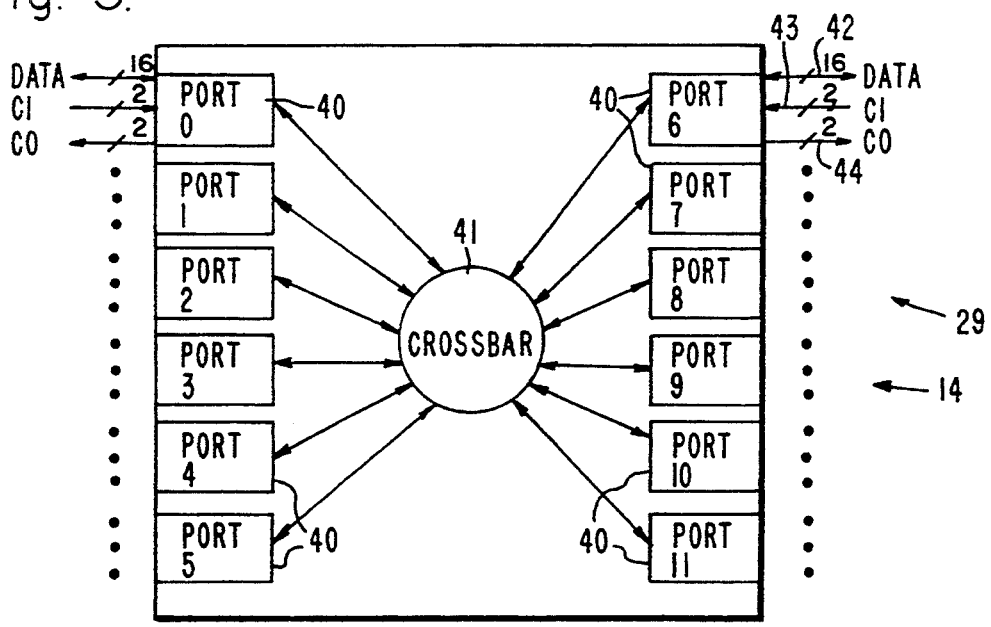
FIG. 5 illustrates the organization of the data network and sub data flow network of FIGS. 1 and 2 and and FIGS. 3 and 4, respectively.

Referring to FIG. 5, it illustrates the organization of both the data network 14 of FIGS. 1 and 2 and the sub data flow network 29 of FIG. 4 which comprises a plurality of data ports 40 that represent data netowrk ports 13 and gateways 30, 32, respectively, that are interconnected by way of a conventional crossbar 41. Each port 40 comprises a plurality of data paths 42 and a plurality of control paths 43, 44 that are coupled to the signal processing clusters 11a–d in the case of the data network 14 or in the case of the sub flow data network 29 to the functional processing elements 23 data network ports 25 and 2nd control bus 22.

In operation, and with reference to FIG. 2, the system control processor 21 is disposed in each cluster of all common integrated processor configurations. The system control processor 21 executes a common integrated processor local operating system, implements local cluster processing element management, performs graph processing control, and executes application software. The system control processor 21 comprises a 32 bit CPU, a memory, and interfaces to the functional processing elements 23 and other common integrated processors for redundancy and additional processing capability, it is possible to have multiple system control processors in parallel in each cluster located between the first and second control buses.

The system control processor 21 functions as a coordinator and job dispatcher. It is adapted to host a local operating system. The system control processor 21 executes application executives, performs I/O management functions, and schedules jobs to be executed by the functional processing elements. The system control processor 21 performs 2nd control bus arbitration for each bus clock (10 MHz, for example), granting access to requester with highest priority. The system control processor 21 provides hardware capabilities that implement common integrated processor data security. The system control processor 21 provides for control of cluster level test and maintenance functions via the first and second test and maintenance busses 20, 26 and is adapted to control common integrated processor global test and maintenance functions via the first and second test and maintenance busses 20, 26.

The system control processor 21 is a modular self-contained 32-bit computer. The hardware architecture is comprised of a 32-bit CPU, start-up read-only memory (SUROM) and random access memory (RAM), 1st and 2nd control bus interface, test and maintenance bus interfaces, a multiport memory controller, an interrupt controller, a system wall clock, an interval timer, and a user command controller. The design allows high speed, efficient execution of the CPU's 32-bit instruction set while concurrently communicating over these interfaces. System debug capability is implemented for hardware and software development, integration, and test.

The global bulk memory 24 supports virtual memory addressing and dynamic segmentation. Two basic storage entities, queues and buffers are accessed. by means of several addressing modes. Access to the global bulk memory 24 for data storage is through seven independent bidirectional ports. Four ports 27 provide the interfaces to the processing elements 23a–c, two ports 25 provide the interfaces to the data network 14, and one port 28 provides the interface to the 2nd control bus 22.

The memory array 33 of the global bulk memory 24 is organized into rows and columns. The number of columns is application dependent, based on the amount of circuitry permitted by the application, the storage capacity and memory bandwidth desired as opposed to the number of processing elements provided. The array design allows the number of columns to be configurable to either eight, twelve, or sixteen. Each column provides a 32-bit field for data plus additional bits for error detection/correction.

A variety of addressing modes are provided, including string addressing, skew addressing, corner turning, random access, and circular queue. Each column of the memory is independently addressable for automatic corner turning with column addresses 38 being separately calculated in the memory access and address control 34, 34a for each column of the memory.

The first control bus 12 may be implemented as a parallel inter-module (PI) bus as per the UHSIC Phase 2 Interoperability Standards Specification Version 2.0. The PI bus is a linear, multi-drop communications medium that transfers datum serial, bit parallel information among up to 32 modules residing on a single backplane. The datum size may be a single word or a double word. PI bus modules are those modules which implement the slave only or master and slave portions of the PI bus protocol. Conceptually, each module on the port interface bus comprises a device that performs the application specific function of the module and a bus interface that implements the PI bus master-slave communications protocol.

Each signal processing cluster 11 is modeled as a virtual memory space with a 32 bit address range. The PI bus interface is modeled as a separate memory space with an 8 bit data link register address range. A separate 8 bit virtual address called the slave ID is used by the bus master to select one or more modules to participate in a particular communications sequence as slave(s).

The PI bus uses a master-slave protocol under which communications sequences are defined for transferring messages between modules and changing bus mastership. The PI bus communications sequences are listed in Table 1. The vie sequence is performed only when there is no current bus master. All other sequences are performed under the control of the current bus master.

The PI bus uses a set of protocol state transitions to define and control the communication sequences. Protocol state transitions are signaled on the cycle type lines and are controlled by the bus master. The slave(s) operate in synchronization with the bus master and signal compliance with protocol state transitions using the acknowledge set lines. The slave(s) also use the acknowledge set lines to notify the bus master of any uncorrectable errors that are detected.

TABLE 1

PROCESSOR INTERFACE
BUS COMMUNICATIONS SEQUENCES

| Sequence Type | Function |
| --- | --- |
| Mastership Sequences: | |
| Vie | Assigns bus mastership to the highest priority module contending for master-ship through arbitration. |
| Tenure Pass Message | Transfers bus mastership from current bus master to another module or changes the bus master's message priority. |
| Message Sequences: | |
| Parameter Write | Transfer a 1 word parameter and a 32 bit address from the bus master device to the slave device(s). |
| Block Message | Transfer up to 65,536 datum units from slave device to master device or from master device to slave(s). Master sends a 32 bit address and may send 6 other Header words. May be used to continue a suspended message. |
| Bus Interface Message | Transfer up to 256 words from slave bus interface to the master device or from master device to slave Bus Interface(s). Master provided an 8 bit address. |
| Exception Sequences: | |
| Suspend | Suspends a Block Message data sequence and transfers Resume Control Words from the slave to the master. |
| Abort | Abnormally terminates current sequence. |
| Idle | Bus not in use and no current bus master defined. |
| Vie | State following IIde. Used to select the next bus master from one or more contending modules. The module with the highest priority is selected as |

TABLE 1-continued
PROCESSOR INTERFACE BUS COMMUNICATIONS SEQUENCES

| Sequence Type | Function |
|---|---|
| | the next bus master. |

The seven sequence states defined for the port interface bus protocol are summarized in Table 2. Within each sequence state, bus states are defined to distinguish individual bus cycles.

TABLE 2
PROCESSOR INTERFACE BUS PROTOCOL STATES

| Protocol State | Function |
|---|---|
| Header | State in which information is transmitted by the master to specify the type of message sequence, identify modules to participate as slaves and specify additional application dependent information. |
| Header Acknowledge | State following Header during which slave modules(s) provide sequence status information to the master. |
| Data | State during which data are transferred between the slave module(s) and the master for Block Messages and Bus Interface Messages. Block Message Suspend sequences are performed under this protocol state. |
| Data Acknowledge | State following Data during which slave module(s) provide message status information to the master. |
| Abort | State used to abnormally terminate another bus sequence. |

The second control bus 22 may be implemented as an element control bus. In such a mode, the second control bus 22 is the primary command and control path within a cluster. It provides a moderately high bandwidth, low latency bus between the system control processor 21 and other cluster modules. The second control bus 22 provides a 48-bit parallel data path comprised of 16 bits of address and control information and 32 bits of data.

The second control bus 22 electrical interface comprises a 48-bit data bus and discrete control lines associated with the element control bus. These discrete lines are bus request (BECBR), preobus grant (BECBG), global transaction valid (BECGTV), parity error (BECERR), ID load (BECIDLD), slot enable (BECSLEN), UNIT reset (RESET) and a clock signal.

A bus terminal is the interface to the element control bus. A signal processing cluster 11a may have multiple bus terminals. Each terminal has a unique pair of BECBR and BECBG lines while the 48-bit data bus and other discrete control lines (BECIDLD, BECGTV, BECERR, RESET and the clock signal) may be shared. Modules whose terminals have programmable ID registers have a unique BECSLEN line for each terminal.

Bus arbitration is controlled by the system control processor 21. Arbitration occurs each bus cycle (one element control bus clock) with the highest priority requester granted usage of the bus on the next cycle. Thus, word by word message interleaving based on sender priority occurs.

The element control bus request (BECBR) signals are used by an element control bus sending terminal to notify the element control bus arbiter (within the system control processor 21) that it desires access to the bus. Each bus terminal has a unique BECBR signal. Each element control bus request has a matching element control bus pre-bus grant signal (BECBG).

The element control bus pre-bus grant (BECBG) signals are used by the element control bus arbiter to notify a sending bus terminal which is requesting bus access that it will source a data word on the next bus cycle. Each bus terminal has a unique BECBG signal. The BECBG signal will be an element control bus arbiter sourced, active low signal. The granted sender is responsible for sourcing data onto the element control bus based on its active grant.

The element control bus global transaction valid signal (BECGTV) is generated by receiving terminals to indicate successful reception of an element control bus transfer. This signal is asserted low by the receiver to indicate to the sender the destination of the transfer was not busy and thus able to receive data. If the destination of the transfer is busy, this signal is asserted high by the receiver to indicate to the sender the destination was not able to receive data. BECGTV is a multiple source, multiple destination signal.

The sender examines the BECGTV signal during the same bus cycle of the data transfer in question to determine if the transfer was successful (BECGTV low). If the data word was not received (BECGTV high), the sender shall resend the same data after a time-out period. This time-out period is implemented as either a fixed 8 clock delay or a 4-bit programmable delay.

The element control bus parity error signal (BECERR) is used by the receiving and sending bus terminals for parity error reporting. The BECERR line is asserted low by the receiver of the data to indicate to the sender that element control bus data was received with a parity error. The BECERR line is asserted high by the receiver of the data to indicate to the sender that element control bus data was not received with a parity error. BECERR is a multiple source, multiple destination signal.

The sender generates a value for BECC01 to assure odd parity of the entire 48-bit bus word. Odd parity means that the total number of bits set to logic '1' in the 48-bit word adds up to an odd value. When a receiving bus terminal determines that it is the destination of the transfer, it examines the data to confirm odd parity. If the receiver detects an even parity condition, it drives the BECERR line low. The receiver must not accept data received when it determines there is parity error. If the receiver detects an odd parity condition, it drives BECERR high (no parity error).

The first and second test and maintenance busses 20, 26 may be implemented as a test and Maintenance (TM) bus. The TM bus standardizes a common command set and the usage of each command for all modules. This command set and its usage is the VHSIC Phase 2 Interoperability Standard TM-Bus Specification Version 1.2.

Each TM-bus in the signal processing system 10 of the present invention is a linear serial multi-drop data bus consisting of 2 sets of 4 lines. One set of lines is the main communication path between the master and slaves. The secondary set of 4 lines is a redundant path to maintain TM-bus functionality in the event of a failure on the main bus. The mechanization, definition, and usage of these 4 lines for each set of TM buses are specified in the VHSIC Phase 2 Interoperability Specification Version 1.2.

The global bulk memory interface to each functional processing element 23 comprises of a 32-bit point-topoint bidirectional data bus with three control lines and an interface clock. Each side of the interface sources a handshake signal, allowing either side to control the flow of data over the interface. Because the data network ports 25 are bidirectional, a direction discrete, sourced by the global bulk memory, is used to define the direction of data flow.

Data is transferred between global bulk memory and processing element according to predefined tasks. A task is the transfer of a single block of data to or from the global bulk memory and accessed in the sequence described by the associated "global bulk memory task description." The global bulk memory task description contains the start address for the block to be transferred, the block length, the sequence in which data is accessed, and other information related to the transfer. Using the information contained in the task description, the global bulk memory 24 stores or retrieves data from storage without real time address control by the user.

An overview of the operations required to perform a data transfer over the global bulk memory/processing element interface is given below. For a write operation (a processing element-to-global bulk memory data transfer), the processing element 23 transmits a write request to the global bulk memory over the 2nd central bus 22 which can be on element control bus by sending a "task initiate" control word. The global bulk memory 24 then initializes the port connected to the processing element to accept data. When handshake signals from both sides are activated, data are transferred one 32-bit word per clock and stored into the global bulk memory locations specified by the task description.

For a read operation comprising a global bulk memory 24 to processing element 23 data transfer, the processing element 23 transmits a read request to the global bulk memory 24 over the 2nd control bus 22 by sending the task initiate signal. The global bulk memory 24 then initializes the appropriate port for output. Data are retrieved from the global bulk memory locations specified by the task description. When both handshake signals are activated, data are transmitted to the processing element 23 one 32-bit word per clock until the task is completed.

Because the interface is bidirectional, the direction discrete is used to determine the direction that data will be transferred. The direction discrete is sourced by the global bulk memory 24. The processing element 23 activates its data line drivers only when the direction discrete is in the state to indicate processing element-to-global bulk memory transfers. The direction discrete also provides an indication to the processing element that the global bulk memory has finished a task, by toggling the direction discrete after the last word of a task is sent.

The data network 14 provides multiple, simultaneous, half duplex, high bandwidth data transfer channels between users. For each processing cluster 11, a data network user can be either a global bulk memory 24 or a network interface unit. The signal flow path between two users is called a data network route. The data network 14 is comprised of two data network element modules operating in parallel. Data transfer is accomplished through both data network elements synchronously such that one data network element transfers the most significant half of each data word (the high slice) while the other transfers the least significant half (the low slice). As such, 32-bit data words are bit sliced by the transmitting user for transfer through two parallel 16-bit (half word) data network paths. Synchronization of the parallel paths is maintained by both the master user and the slave user. A master is defined as the transmitter of data and the initiator of the route request that established the data network route. A slave is therefore then routed to data receiver.

The data network 14 contains switching circuitry, or crossbar 41, to allow simultaneously two point data transfers between every pair of ports and can be dynamically reconfigured. The two data network element modules combined provide twelve 32-bit (full word) ports to which users possessing a data network port function may be connected. The data network port function supports the data network element port protocol and monitors the synchronization of the two parallel data network element modules.

The data network 14 provides data transfer paths between up to twelve users, where a module (or complex of modules) containing the required data network interfacing data network port function is considered a user. The two data network element modules, referred to as the data network complex, are capable of supporting up to six simultaneous and independent 32-bit data transfer channels. Each data network element module data transfer path is point-m-point and initiated by the transmitting user such that two identical and parallel half word paths, one through each data network element module, are established before data transfer is initiated.

Synchronization of the two paths is maintained by subjecting each data network element of the data network 14 to identical control stimulation from every user and monitored by both the transmitting and receiving users' data network ports. The two data network element modules in a data network complex operate independently during route establishment, data transfer, and route disconnect. FIG. 5 shows a functional block diagram illustrating the bidirectional, half word user to user interface capability of one of the data network modules.

The data network element port interface is the method of communication between the data network element module and a user module's data network port. Each data network element port interface, as shown in FIG. 5, is comprised of 20 signals: 16 half duplex bidirectional data lines, 2 control inputs (CI) and 2 control outputs (CO).

Each data transmission path has an independent master driven data transfer protocol. Master driven is the concept whereby the data source is the master and initiates the data network route. Either the master or the slave are allowed to terminate a data network route. Both the master and the slave provide flow control to prevent loss of data when either is not ready to continue a transfer.

Each data network element port has data storage registers, with the ability to register and store up to two 16-bit half words and control storage registers to store codes sent on the 2 control inputs. The registers allow the data path to be frozen without loss of data during receiver generated wait requests. The slave's CO lines provide flow control and are not frozen.

Each data network element port supports one pend which is either a pending route or a receiver pend request. A pending route is defined as reserving the requested data network element port for the next transfer path. Any route requesting data network element port enters the pending route state if its destination was both active and not already pended. A receiver pend request is defined as the process in which a slave data network port reserves its attached data network element port for output during the next transfer. The pending route operation of the data network 14 is illustrated in Table 3 below.

TABLE 3

Pending Route

| Time | Port 13a | Port 13b | Port 13c | Port 13d |
|------|----------|----------|----------|----------|
| T = 1 | Port 13a routed to Port 13b; | | | |
| T = 2 | Message 1 being sent; | Port 13c tries to route message 2 to Port 13b with the same priority as message 1; | | |
| T = 3 | Message 1 being sent; | Port 13c; pending | Port 13c; pending | Port 13d will get busy if it tries to route message 3 to Port 13b; |
| T = 4 | Message 1 completed; | | Message 2 routed and sent | |

It is also possible to interrupt a lower priority message on the data network 14 with a higher priority message. This is illustrated in Table 4 below.

TABLE 4

Message Priority

| Time | Port 13a | Port 13b | Port 13c | Port 13d |
|------|----------|----------|----------|----------|
| T = 1 | Port 13a routed to Port 13b | | | |
| T = 2 | Message 1 being sent; | Port 13c tries to route message 2 to Port 13b with a higher priority than message 1 | | |
| T = 3 | Message 1 suspended; | | Message 2 routed and sent; | Port 13d will get busy if it tries to route message 3 to Port 13b; |
| T = 4 | Message 1 continued | | | |

If Port 13d message 3 has a higher priority than message 1 then message 3 will be sent directly to Port 13b with Port 13a suspended, and then message 1 will be continued. Message 2 will be sent to Port 13b when message 1 is completed.

Thus there has been described a new and improved multiple cluster signal processor architecture that provides for very low latency while at the same time providing high throughput. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A signal processor architecture comprising:
   a data network comprising a plurality of sets of data network ports and a crossbar switch interconnecting each of the data network ports that provides for communication between each of the data network ports;
   a first control bus; and
   a plurality of signal processing clusters interconnected by means of said first control bus, and connected to said data network by means of a predetermined set of data network ports, each signal processing cluster comprising:
   (1) a global bulk memory having a plurality of first global bulk memory ports that are respectively connected to said predetermined set of data network ports on said data network, said global bulk memory comprising:
   (a) a sub data flow network having multiple gateways and full crossbar interconnectivity between each of said multiple gateways, wherein said subdata flow network together with said data network provide;
   (i) a means whereby data can be transferred via said substrate flow network and said data network between any of said functional processing elements in one said signal processing cluster and any said functional processing elements in another said signal processing cluster, and
   (ii) a means whereby data can be transferred via said subdata flow network and said data network between any of said functional processing elements in one of said signal processing cluster and said global bulk memory in another of said signal processing clusters; and
   (b) wherein each of said plurality of first global bulk memory ports and said plurality of fourth global bulk memory ports on said global bulk memory are connected to one of said multiple gateways on said sub data flow network so that data can be transferred via said sub data flow network between any of said functional processing elements and between any functional processing element and said data network ports connected to said plurality of first global bulk memory ports on said global bulk memory;
   (2) wherein each signal processing cluster further comprises:
   (a) a system control processor connected to said first control bus,
   (b) a second control bus connected to said system control processor and to said global bulk memory by means of a third global bulk memory port, and
   (c) a plurality of functional processing elements connected to said system control processor by means of said second control bus and connected to a plurality of fourth global bulk memory ports on said global bulk memory;

and wherein the data network ports and first global bulk memory ports of one signal processing cluster cooperate with the data network ports and global bulk memory ports of other signal processing clusters to provide simultaneous access to all global bulk memories by all signal processing clusters.

2. The signal processor architecture of claim 1 wherein each signal processing cluster further comprises:
   at least one input/output element connected to a fifth data network port on said data network and to said second control bus and wherein said input/output element has an input/output interface: and
   wherein said sub data flow network together with said data network provides a means for transferring data between said input/output element and said global bulk memories in any of said signal processing clusters and, between said input/output element and said functional processing element in any of said signal processing clusters.

3. The signal processor architecture of claim 2 wherein said data network further comprises:
   means coupled to the data network ports of the data network for determining priority between data network ports that attempt to simultaneously access one data network port by way of said crossbar switch, and wherein each data network port has a priority level;
   means coupled to the data network ports of the data network for sending busy signals to data network ports that attempt to access a data network port that is currently communicating with another data network port;
   means coupled to the data network ports of the data network for placing into a pending status a first in time data network port that attempts to route data to a currently busy data network port until said currently busy data network port is unbusy, and wherein said first in time data network port with pending status receives access to said unbusy data network port before any second in time data network port having a higher priority level receives access to said unbusy data network port; and
   means coupled to the data network ports of the data network for temporarily suspending a message having a low priority level to or from a particular data network port on said data network so that a message having a higher priority level can be sent to or from the particular data network port on said data network.

4. The signal processor architecture of claim 1 wherein said global bulk memory further comprises:
   a memory array having a plurality of word-wide columns;
   means for packing words connected to each of said global bulk memory ports;
   a global memory bus connected to the memory array and to an output of said means for packing words and wherein said global memory bus comprises said plurality of worldwide columns;
   means for unpacking words connected to said global memory bus and having an output connected to each of said global bulk memory ports; and
   means for addressing said memory array coupled to said memory array and to said global memory ports, wherein for comer turn addressing of the memory array, each of the plurality of word-wide columns is independently addressed, and wherein access to said memory array and said global memory bus is simultaneously arbitrated during each memory array cycle time.

* * * * *